United States Patent [19]
Graber et al.

[11] Patent Number: 5,994,249
[45] Date of Patent: *Nov. 30, 1999

[54] BLUE COLORED GLASS COMPOSITION

[75] Inventors: Dennis R. Graber, Toledo; Paige L. Higby, Maumee, both of Ohio

[73] Assignee: Libbey-Owens-Ford Co., Toledo, Ohio

[ * ] Notice: This patent is subject to a terminal disclaimer.

[21] Appl. No.: 09/121,390

[22] Filed: Jul. 23, 1998

Related U.S. Application Data

[60] Provisional application No. 60/053,822, Jul. 25, 1997.

[51] Int. Cl.$^6$ .................................................... C03C 3/087
[52] U.S. Cl. .............................. 501/71; 501/904; 501/905
[58] Field of Search ................................ 501/71, 904, 905

[56] References Cited

U.S. PATENT DOCUMENTS

| | | | |
|---|---|---|---|
| 5,411,922 | 5/1995 | Jones | 501/71 |
| 5,688,727 | 11/1997 | Shelestak et al. | 501/71 |
| 5,780,372 | 7/1998 | Higby | 501/71 |
| 5,807,417 | 9/1998 | Boulos et al. | 501/71 |

FOREIGN PATENT DOCUMENTS

653388 A1   5/1995   European Pat. Off. .

*Primary Examiner*—Michael Marcheschi
*Attorney, Agent, or Firm*—Marshall & Melhorn

[57] ABSTRACT

A soda-lime-silica glass having, at a thickness in the range of 3 mm to 10 mm, a visible light transmittance of 35% to 75%, a total solar radiation transmittance in the range of 20% to 60%, an ultraviolet radiation transmission less than 55%, and a blue color defined by the "CIELAB" system of L=65 to 90, a*=−15 to −4, and b*=−15 to −2. The soda-lime-silica glass composition includes the essential ingredients of about 0.5% to about 0.9% weight percent total iron (as $Fe_2O_3$), about 50 ppm to 100 ppm CoO, and about 0.1 to about 2.0 weight percent $TiO_2$, with a ferrous iron to total iron ratio of about 20% to about 40%.

9 Claims, No Drawings

BLUE COLORED GLASS COMPOSITION

RELATED APPLICATION

This application is claiming the benefit, under 35 U.S.C. § 119(e), of the provisional application filed Jul. 25, 1997, under 35 U.S.C. § 111(b), which was granted a Ser. No. of 60/053,822. The provisional application, Ser. No. 60/053,822, is hereby incorporated by reference in its entirety.

BACKGROUND OF THE INVENTION

The present invention relates to blue colored glass compositions. More particularly, the present invention relates to blue colored glasses which can be made by the float process and which are primarily, but not exclusively, intended for use in architectural applications.

It has become desirable that glasses primarily intended for use in architectural applications, e.g. glazings for buildings, should be heat absorbing. A useful colorant for such purposes is iron because the presence of ferrous, as distinct from ferric, iron in the glass reduces the infrared transmission of the glass. Iron provides the glass with a green coloration. However, a blue colored glass would in some instances be preferred by architects.

Blue colored glasses are most easily produced simply by adding cobalt oxide to a batch composition. However, cobalt oxide reduces the light transmission of the glass and does relatively little to reduce the infrared (heat) transmission.

Alternatively, blue glasses can be produced by using solely iron as the colorant. This is achieved by increasing the proportion of total iron in the ferrous state to very high levels or values, often in excess of 50%. However, the glass then becomes progressively more difficult to melt without the risk of inclusions being formed in the glass, particularly silica scum. Furthermore, sulphate is often used to refine the glass and, at very high ferrous levels, iron sulphide may be produced which makes the predominant color of the glass yellow or amber.

Accordingly, to overcome these problems, batches containing very low amounts of sulphate and techniques such as vacuum refining have been suggested. It has been reported that this latter procedure is, in itself, difficult to operate. Alternatively, special reagents, which are relatively expensive, may be used to avoid the need for special refining techniques. For example, oxides of tin may be required. Ultraviolet radiation absorption is, however, reduced in glasses having a high ferrous to ferric iron ratio. This is because ferric iron absorbs strongly in the ultraviolet portion of the spectrum.

DESCRIPTION OF THE PRIOR ART

Blue glasses manufactured at a high ferrous state are described in various prior art documents. For example, U.S. Pat. No. 4,792,536 describes a blue glass containing 0.45% to 0.65% $Fe_2O_3$ which is melted at high ferrous states in excess of 35% under very special conditions. Moreover, the sulphate level in the final product must be maintained at a very low level below about 0.02% $SO_3$, to prevent amber colored glass being formed due to the presence of sulphur.

U.S. Pat. No. 3,652,303 describes blue glasses containing from 0.1% to 2% $Fe_2O_3$ with an extremely high ferrous state content in excess of 80%. This high ferrous state is achieved by the inclusion of tin oxide in the glass composition. In order to prevent the production of an amber coloration, it is necessary to balance the tin and ferrous iron content. The ratio of stannous to ferrous ions needs to be maintained, on a mole per cent basis, at least 1:1.

Blue glasses are also described in U.S. Pat. No. 5,013,487. These glasses contain from 0.3% to 0.7% $Fe_2O_3$ and a high ferrous state is maintained by the use of at least 0.5% ZnO. These glasses may be difficult to produce. In particular, there is a risk that the zinc oxide will be reduced, in the float bath, to zinc metal. This leaves a surface bloom on the glass. Still further, U.S. Pat. No. 5,344,798 describes a blue glass containing 0.3% to 0.9% $Fe_2O_3$ but having a ferrous iron to ferric iron ratio of 0.8 to 2.5:1. This is equivalent to a ferrous content of between 44.4% to 71.5%.

In the literature, there are described other methods of producing blue glasses and such methods are compatible with conventional float glass manufacture. A blue-green glass is described in U.S. Pat. No. 2,755,212. This glass contains cobalt oxide in addition to iron oxide. The infrared and ultraviolet absorption properties of such glass are controlled by the addition, to the melt, of carbon or another reducing agent and the color is achieved by the addition of the cobalt oxide, typically in an amount of the order of 8 parts per million (ppm) by weight. This relatively small amount of cobalt oxide does not impart a sufficiently deep coloration for the present purposes and the infrared (heat) absorption is not considered to be acceptable by current standards. It should be pointed out that the addition of cobalt to a glass will turn the color blue. However, cobalt has very little effect on the heat transmission characteristics of the glass. It also has the disadvantage that it will reduce the visible light transmission of the glass. The light transmission of the glass also decreases as the percentage of ferrous iron in the glass is increased at a constant total iron content.

On the other hand, U.S. Pat. No. 4,866,010 discloses a glass containing from 0.3% to 0.9% $Fe_2O_3$, 40 to 80 ppm of CoO and 1 to 10 ppm of selenium. However, the use of selenium is not desirable because it is extremely volatile. This gives rise to the difficulty of ensuring the correct amount of selenium is actually present in the glass. Also, selenium affects color in an undesirable way and provides no beneficial effects in achieving a desirable total solar radiation transmission.

A further blue glass containing selenium is disclosed in U.S. Pat. No. 5,070,048. Additionally, such glass contains NiO. The infrared (heat) absorption of such a glass is not, however, acceptable by current standards.

The present invention therefore seeks to provide a blue glass which does not suffer from the disadvantages of the blue glasses described in the above-mentioned prior patents. In particular, the present invention seeks to provide blue glasses without the need for the use of expensive additives such as neodymium and the like and/or difficult materials to handle such as selenium which also has a tendency to impart an undesirable grey tint to the glass.

More specifically, the present invention seeks to provide a glass of unique blue color which has a combination of properties, i.e. visible light transmission (measured under Illuminant D65, 10 degree observer), total solar radiation transmission and ultraviolet radiation transmission, which make it a good choice for architectural glazings.

SUMMARY OF THE INVENTION

According to the present invention, there is provided a blue, ultraviolet and infrared absorbing, soda-lime-silica glass composition comprising a base glass composition and a colorant portion, characterized in that the colorant portion comprises:

Total iron[1] (calculated as $Fe_2O_3$): 0.5% to 0.9% (by weight)
CoO: 50 ppm to 100 ppm (by weight)
$TiO_2$: 0.1% to 2.0% (by weight)

and optionally, cerium and vanadium in amounts of from 0.1% to 2.0% (by weight) and/or chromium in amounts of 50 ppm to 100 ppm (by weight) the proportion of total iron in the ferrous state lying in the range of 20% to 40%, the glass having, at a thickness in the range of 3 mm to 10 mm, a total solar radiation transmission in the range of 20% to 60%, a visible light transmission (Illuminant D65, 10 degree observer) in the range of 35% to 75%, an ultraviolet radiation transmission less than 55%, and a color defined by the "CIELAB" system of L=65 to 90, a*=−15 to −4, and b*=−15 to −2.

A suitable soda-lime-silica base glass composition to which the colorants may be added is:

| | |
|---|---|
| SiO$_2$ | 65% to 75% (by weight) |
| Na$_2$O | 10% to 18% |
| K$_2$O | 0% to 5% |
| MgO | 0% to 5% |
| CaO | 4% to 14% |
| Al$_2$O$_3$ | 0% to 5% |
| B$_2$O$_3$ | 0% to 5% |
| BaO | 0% to 5% |

Preferably, small amounts of sulphate are present in the glass in an amount of from 0.1% to 0.3% by weight.

Suitable batch materials for producing glasses according to the present invention, which materials are compounded by conventional glass batch ingredient mixing devices, include sand, limestone, dolomite, soda ash, salt cake or gypsum, iron oxide and carbon. Additionally, conventional sources for the cobalt oxide and titanium dioxide colorants are suitable for use in the present glass composition. In a preferred embodiment of the present invention, the use of ilmenite as the source of titanium is particularly advantageous, supplying at least a partial amount of the Fe$_2$O$_3$ as well as titanium dioxide. Additionally, in accordance with the present invention the use of wuestite as the source of iron is particularly advantageous, supplying at least a partial amount or preferably substantially all of the Fe$_2$O$_3$ and substantially eliminating the need for carbon.

These batch materials are conveniently melted together in a conventional glass making furnace, to form a blue colored infrared energy and ultraviolet radiation absorbing glass composition, which thereafter may be continuously cast onto the molten metal bath in a float glass process. The flat glass thus produced may be formed into architectural glazings, or cut and formed, such as for example by press bending and optionally tempered, to provide automotive glazings.

The addition of titanium dioxide has been found to be essential to achieve the desired ultraviolet radiation absorption level in the glass without adversely affecting the other critical optical properties as above set forth.

In a desirable aspect of the present invention, the glass, in a nominal thickness of 5.66 mm, has a light transmission of 50% to 65%, a total solar radiation transmission which is less than 45%, optimally less than 40%, and an ultraviolet transmission which is less than 50%, optimally less than 40%.

We have unexpectedly found that the composition of the present invention gives glasses of the desired blue coloration, due principally to the CoO content, but with properties which render it suitable for use as an ultraviolet and infrared or heat absorbing glass. Simultaneously, the glass has a luminous transmission which is sufficiently high to allow the glass to be used in many different architectural applications. Moreover, such composition allows the glass to be easily manufactured without the here-in-before described problems occurring.

For purposes of clarity, definitions of certain properties of glasses in accordance with the invention are as follows. The "ferrous" iron content of a glass is determined by first measuring the radiant transmission of a sample at a wavelength of 1060 nanometers (nm), using a spectrophotometer. The 1060 nm transmission value was then used to calculate optical density, using the following formula:

$$\text{Optical density} = \text{Log}_{10} \frac{T_0}{T} \quad (T_0 = 100 \text{ minus estimated loss}$$
$$\text{loss from reflection} = 92;$$
$$T = \text{transmission at 1060 nm}).$$

The optical density was then used to calculate the percent reduction or ferrous value:

$$\text{percent reduction} = \frac{(110) \times (\text{optical density})}{(\text{Glass thickness in mm}) \times (\text{wt\% total Fe}_2\text{O}_3)}$$

The "light transmission" (LT) refers to the visible transmission according to the daylight spectrum which is known as "Illuminant D65, 10 degree observer". References to UV or ultraviolet radiation transmittance is an integrated term representing the area under the transmittance versus wavelength curve for wavelengths between 300 and 400 nm integrated at 5 nm intervals, using a trapezoidal integration method employing weighting factors according to air mass 2.0; and references to total solar radiation transmittance (TSOL) are references to solar transmittance integrated over the wavelength range 300 to 2130 nm according to the relative solar spectral distribution for air mass 1.5.

Glass color is defined according to the "CIELAB" system, and using Illuminant D65, 10 degree observer.

Unless otherwise noted, the term percent (%) and parts as used herein and in the appended claims, means percent and parts by weight.

DESCRIPTION OF THE PREFERRED EMBODIMENT

A preferred composition in accordance with the present invention is:

| | |
|---|---|
| Total Iron | 0.6% to 0.75% |
| Ferrous state | 25% to 30% |
| CoO | 50 ppm to 75 ppm. |
| TiO$_2$ | 0.1% to 0.3% |

Optimally, the composition in accordance with the invention advantageously consists essentially of:

| | |
|---|---|
| Total Iron | 0.6% to 0.7% |
| Ferrous state | 25% to 30% |
| CoO | 55 ppm to 70 ppm. |
| TiO$_2$ | 0.1% to 0.2% |

Such glasses can be made in a conventional glass making furnace at economic load and do not necessitate the use of expensive raw materials.

The above preferred glass compositions exhibit, at a nominal thickness of 5.66 mm, a light transmission of 50% to 65%, a total solar radiation transmission less than 45%, optimally less than 40%, and an ultraviolet radiation transmission less than 50%, optimally less than 40%, and a color defined by the "CIELAB" system of L=75–85, a*=−12 to −8, and b*=−12 to −8.

The invention will be further illustrated, in a non-limitative fashion, with reference to the following Examples of glasses in accordance with the present invention. Each Example includes a soda-lime-silica base glass composition prepared in accordance with the present invention. The specific colorant compositions are noted for each Example.

| Example | Fe$_2$O$_3$ (%) | CoO (ppm) | TiO$_2$ (%) | Ferrous State | LT | TSOL | UV |
|---|---|---|---|---|---|---|---|
| 1 | 0.71 | 52 | 0.1 | 21 | 60 | 39 | 37 |
| 2 | 0.71 | 54 | 0.26 | 26 | 57 | 34.0 | 34 |
| 3 | 0.70 | 61 | 0.27 | 20.5 | 55 | 37 | 29 |
| 4 | 0.72 | 54 | 0.23 | 22.7 | 58 | 35 | 35 |
| 5 | 0.644 | 56 | 0.144 | 27.3 | 56.6 | 34.7 | 35 |
| 6 | 0.65 | 62 | 0.134 | 26.1 | 56.7 | 35.2 | 35.8 |
| 7 | 0.64 | 60 | 0.13 | 26.5 | 56.7 | 35.2 | 35.86 |
| 8 | 0.643 | 65 | 0.12 | 26.7 | 56.35 | 35.05 | 36.25 |
| 9 | 0.641 | 63 | 0.115 | 26.4 | 56.57 | 35.06 | 36.6 |
| 10 | 0.641 | 63 | 0.115 | 26.4 | 41.82 | 21.7 | 24 |
| 11 | 0.655 | 58 | 0.143 | 26.5 | 40.7 | 20 | 21.4 |
| 12 | 0.64 | 60 | 0.13 | 26.5 | 65.5 | 45.6 | 44.5 |
| 13 | 0.64 | 62 | 0.111 | 27.2 | 57 | 35.2 | 36.4 |

| Example | L | a* | b* | Thickness (mm) |
|---|---|---|---|---|
| 1 | 81.7 | −8.9 | −8.3 | 5.66 |
| 2 | 80.1 | −10.2 | −8.40 | 5.66 |
| 3 | 78.5 | −9.5 | −8.1 | 5.66 |
| 4 | 80.5 | −9.9 | −8.3 | 5.66 |
| 5 | 79.99 | −9.5 | −9.03 | 5.66 |
| 6 | 80.01 | −9.44 | −9.8 | 5.66 |
| 7 | 80.02 | −9.44 | −9.78 | 5.66 |
| 8 | 79.81 | −9.38 | −10.26 | 5.66 |
| 9 | 79.94 | −9.44 | −10.08 | 5.66 |
| 10 | 70.74 | −13.12 | −14.8 | 9.337 |
| 11 | 70.0 | −14 | −13.9 | 10.0 |
| 12 | 84.8 | −7.11 | −7.17 | 3.939 |
| 13 | 80.2 | −9.4 | −9.8 | 5.595 |

This description of the invention has been made with reference to specific examples, but it should be understood that variations and modifications as are known to those of skill in the art may be resorted to without departing from the scope of the present invention.

We claim:

1. An ultraviolet and infrared radiation absorbing blue glass composition comprising a soda-lime-silica base glass composition and a colorant portion consisting essentially of:

| Total Iron (Expressed as Fe$_2$O$_3$) | 0.5% to 0.9% (by weight) |
|---|---|
| CoO | 50 ppm to 100 ppm (by weight) |
| TiO$_2$ | 0.1% to 2.0% (by weight) | and, optionally, one or more of:

| Cerium | 0.1% to 2% (by weight) |
|---|---|
| Vanadium | 0.1% to 2% (by weight) |
| Chromium | 50 ppm to 100 ppm (by weight) | the proportion of total iron in the ferrous state lying in the range of 20% to 40%, the glass having at a thickness in the range of 3 mm to 10 mm, a total solar radiation transmission in the range of 20% to 60%, a visible light transmission (Illuminant D65, 10 degree observer) in the range of 35% to 75%, an ultraviolet radiation transmission less than 55%, and a color defined by the "CIELAB" system of L=65 to 90, a*=−15 to −4, and b*=−15 to −2.

2. An ultraviolet and infrared radiation absorbing blue glass composition comprising a soda-lime-silica base glass composition and a colorant portion consisting essentially of:

| Total Iron (as Fe$_2$O$_3$) | 0.6% to 0.75% (by weight) |
|---|---|
| CoO | 50 ppm to 75 ppm (by weight) |
| TiO$_2$ | 0.1% to 0.3% (by weight) | the proportion of total iron in the ferrous state lying in the range of 25% to 30%, the glass having at a thickness in the range of 3 mm to 10 mm, a total solar radiation transmission in the range of 20% to 60%, a visible light transmission (Illuminant D65, 10 degree observer) in the range of 35% to 75%, an ultraviolet radiation transmission less than 55%, and a color defined by the "CIELAB" system of L=65 to 90, a*=−15 to −4, and b*=−15 to −2.

3. A glass as claimed in claim 2, having in a nominal thickness of 5.66 mm a light transmission of 50% to 65%, a total solar radiation transmission less than 45%, and an ultraviolet radiation transmission less than 50%.

4. An ultraviolet and infrared radiation absorbing blue glass composition comprising a soda-lime-silica base glass composition and a colorant portion consisting essentially of:

| Total Iron (as Fe$_2$O$_3$) | 0.6% to 0.7% (by weight) |
|---|---|
| CoO | 55 ppm to 70 ppm (by weight) |
| TiO$_2$ | 0.1% to 0.2% (by weight) | the proportion of total iron in the ferrous state lying in the range of 25% to 30%, the glass having a t a thickness in the range of 3 mm to 10 mm, a total solar radiation transmission in the range of 20% to 60%, a visible light transmission (Illuminant D65, 10 degree observer) in the range of 35% to 75%, an ultraviolet radiation transmissio n less than 55%, and a color defined by the "CIELAB" system of L=65 to 90, a*=−15 to −4, and b*=−15 to −2.

5. A glass as claimed in claim 4, having in a nominal thickness of 5.66 mm a light transmission of 50% to 65%, a total solar radiation transmission less than 45%, and an ultraviolet radiation transmission less than 50%.

6. A glass composition as claimed in claim 3, having a color defined by the "CIELAB" system of L=75–85, a*=−12 to −8, and b*=−12 to −8.

7. A soda-lime-silica glass having a base glass comprising on a weight basis: SiO$_2$, 65% to 75% (by weight); Na$_2$O, 10% to 18%; K$_2$O, 0% to 5%; MgO, 0% to 5%; CaO, 4% to 14%; Al$_2$O$_3$, 0% to 5%; B$_2$O$_3$, 0% to 5%; BaO, 0% to 5%; and colorants consisting essentially of:

| Total Iron (expressed as Fe$_2$O$_3$) | 0.5% to 0.9% (by weight) |
|---|---|
| CoO | 50 ppm to 100 ppm (by weight) |
| TiO$_2$ | 0.1% to 2.0% (by weight) | and, optionally, one or more of:

| Cerium | 0.1% to 2% (by weight) |
|---|---|
| Vanadium | 0.1% to 2% (by weight) |
| Chromium | 50 ppm to 100 ppm (by weight) | the proportion of total iron in the ferrous state lying in the range of 20% to 40%, the glass having at a thickness in the range of 3 mm to 10 mm, a total solar radiation transmission in the range of 20% to 60%, a visible light transmission (Illuminant D65, 10 degree observer) in the range of 35% to 75%, an ultraviolet radiation transmission less than 55%, and a color defined by the "CIELAB" system of L=65 to 90, a*=−15 to −4, and b*=−15 to −2.

8. A glass as claimed in claim 2, having in a nominal thickness of 5.66 mm, a light transmission of 50% to 65%, a total solar radiation less than 40%, and an ultraviolet radiation transmission less than 40%.

9. A glass as claimed in claim 4, having in a nominal thickness of 5.66 mm, a light transmission of 50% to 65%, a total solar radiation less than 40% and an ultraviolet radiation transmission less than 40%.

* * * * *